UNITED STATES PATENT OFFICE.

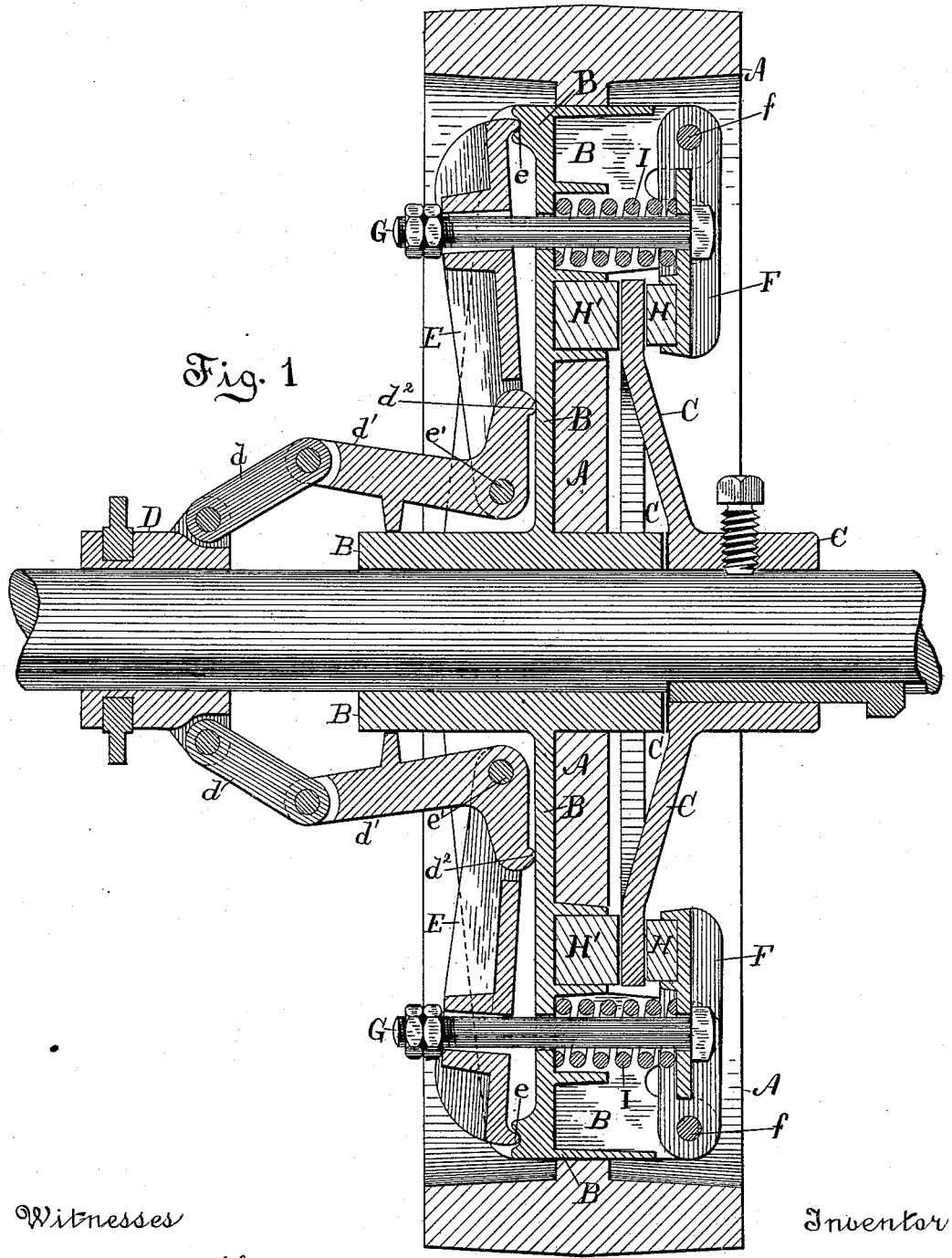

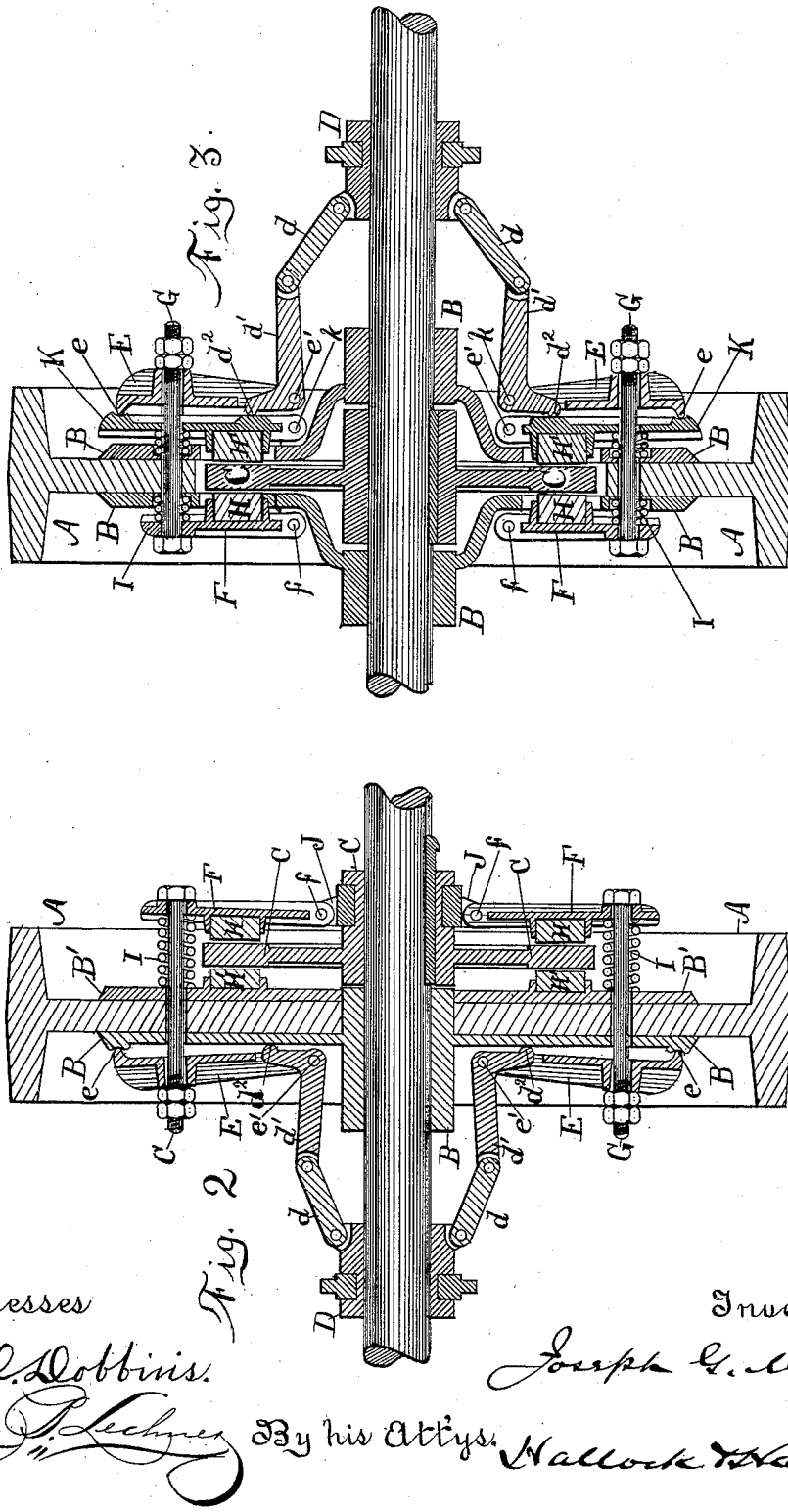

JOSEPH G. MOOMY, OF ERIE, PENNSYLVANIA.

FRICTION-CLUTCH.

SPECIFICATION forming part of Letters Patent No. 410,764, dated September 10, 1889.

Application filed May 28, 1889. Serial No. 312,430. (No model.)

*To all whom it may concern:*

Be it known that I, JOSEPH G. MOOMY, a citizen of the United States, residing at Erie, in the county of Erie and State of Pennsylvania, have invented certain new and useful Improvements in Friction-Clutches; and I do hereby declare the following to be a full, clear, and exact description of the invention, such as will enable others skilled in the art to which it appertains to make and use the same.

This invention relates to that class of friction-clutches wherein the clutching is effected by jaws which grip a flange ring or disk, and it is particularly adapted for use on loose pulleys or gear-wheels.

The primary object of the invention is to provide a friction-clutch of the type mentioned, wherein the gripping-jaws are mounted upon the pulley or gear and the clutch ring or disk is secured to the shaft, whereby, when the pulley or gear is at rest, all the mechanism of the gripping device will be at rest also and accessible for adjustment or repair without stopping the shaft.

My device is illustrated in the accompanying drawings as follows: Figure 1 is a vertical section through a pulley having therein my friction-clutch, the line of section being on a plane parallel with the shaft. Fig. 2 is a like view showing a modified construction of the clutch. Fig. 3 is also a like view, and shows another modified construction.

The several modifications contain the same leading element, and the essential object of the invention is attained by all of them.

The construction shown in Fig. 1 is as follows:

A marks the pulley or wheel upon which the clutch is mounted. This pulley or wheel may be made of wood or metal, as desired.

B marks a metal hub and arms, which support the wheel A when it is made of wood; but when the pulley or wheel is made of iron it will be cast integral with the part B. The part B also supports the clutching devices.

C is a hub and ring or flange, or it may be a solid disk. The part C is secured to the shaft by key or set-screw, but the pulley or wheel and the hub B are mounted loosely on the shaft.

D is a sliding collar on the shaft, by which action is communicated to the clutch levers and jaws through the toggles $d\ d'$.

H H' are clutch-jaws. One of these H is on the lever F, which is pivoted to the arm B at $f$, and the other H' is on the arm B, and when the jaws act the pulley and arm B move bodily toward or from the disk C.

I is a spring for reacting the jaws.

The jaw-actuating mechanism is as follows: The sliding sleeve D is connected with the levers $d'\ d'$ by the links $d$; and the levers $d'\ d'$ are pivoted on the free ends of the levers E and have a bearing at $d^2$ against the fixed part B, (or, as in Fig. 3, against the part K.) The levers E have their bearings at $e$ and act upon the bolts G, which in turn act upon the jaw-levers F. The part B' in Fig. 2 is a facing-plate, which is used when the body of the pulley is made of wood.

My device is especially useful when the pulley A is used to take power from the shaft—that is, when the shaft is a driving-shaft—for the reason that when the pulley is at rest none of the parts are in motion, except the clutch ring or disk. Heretofore it has been a common practice to put the clutch ring or flange on the pulley and the clutching mechanism on the frame which is attached to the shaft. In such a construction the clutching apparatus is always in motion with the shaft, and if they require adjustment or repair the shaft must be stopped, which generally necessitates the stopping of the engine and the whole shop. This is often a very serious matter. With my clutch this difficulty does not occur, for when the clutch is loose it and the pulley are at rest and accessible for adjustment and repair. However, this feature of my construction is not broadly new.

In the construction shown in Fig. 2 the jaw-lever F, in place of being pivoted on the arm B, is pivoted on a special arm J, which is journaled on the hub of the disk C.

In the construction shown in Fig. 3 there are two arms B, one on each side of the pulley, and the clutch ring or disk C is placed between the two arms B, and the jaw H', in place of being on the arm B, is on a second jaw-lever K, which is a companion of the jaw-lever F. The purpose sought to be attained by this form is to place the clutch-ring C in the same plane as the web of the pulley, so that the clutching strain will be exerted in the plane of the web of the pulley more directly than it is in the other forms.

What I claim as new is—

1. In a friction-clutch, the combination of a pulley or wheel A B, mounted loosely upon the shaft, the clutch ring or disk C, fixed to the shaft, jaws H and H', carried by said pulley and arranged on opposite sides of said clutch-ring, the loose sleeve D on said shaft, and the system of levers $d$ $d'$ and E, and the bolt G, mounted on said pulley and serving to operate said jaws.

2. In a friction-clutch, the combination of a clutch ring or disk fixed to the shaft, a loose pulley having bearings on the shaft on each side of the clutch-ring and an opening in its web to receive said clutch-ring, clamping-jaws on opposite sides of said clutch-ring, which jaws are carried by said pulley, a sliding sleeve on said shaft, and a system of levers moved by said sleeve and carried by said pulley for operating said clamping-jaws.

In testimony whereof I affix my signature in presence of two witnesses.

JOSEPH G. MOOMY.

Witnesses:
   JNO. K. HALLOCK,
   WM. P. HAYES.